Sept. 5, 1939.  P. F. SCHOLANDER  2,172,038
METHOD AND APPARATUS FOR CARRYING OUT RESPIRATION ANALYSES
Filed Nov. 30, 1937  5 Sheets-Sheet 1

Sept. 5, 1939.　　　P. F. SCHOLANDER　　　2,172,038
METHOD AND APPARATUS FOR CARRYING OUT RESPIRATION ANALYSES
Filed Nov. 30, 1937　　　5 Sheets-Sheet 2

Inventor:
P. F. Scholander
By C. F. Wendroth
Atty

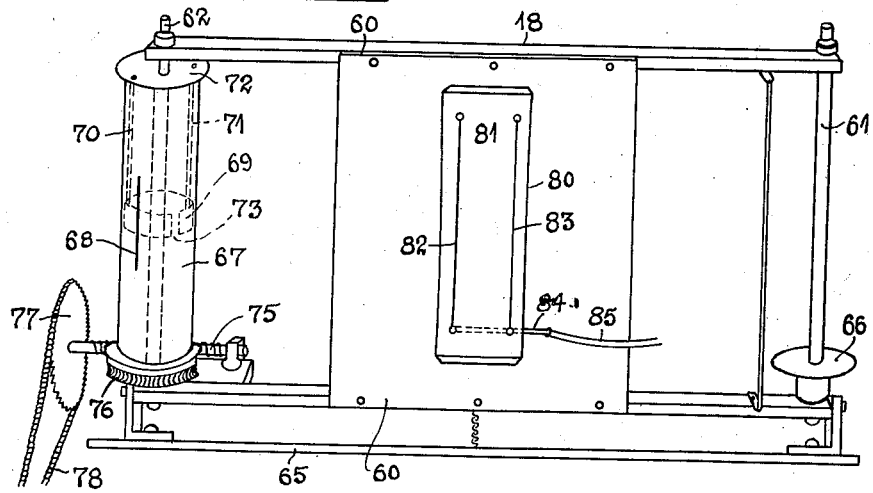
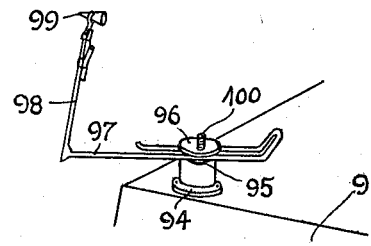
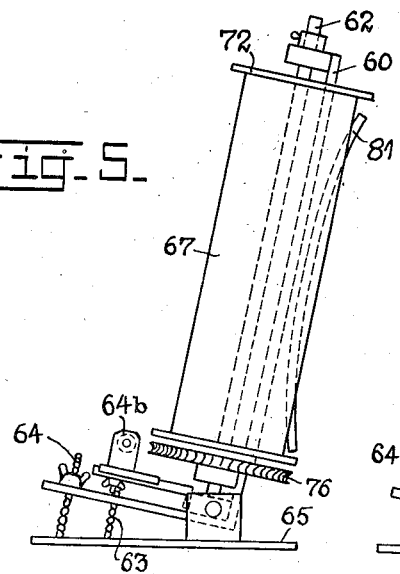
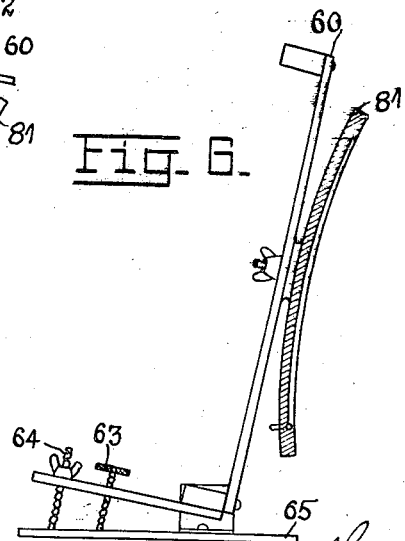

Sept. 5, 1939.   P. F. SCHOLANDER   2,172,038
METHOD AND APPARATUS FOR CARRYING OUT RESPIRATION ANALYSES
Filed Nov. 30, 1937   5 Sheets-Sheet 4
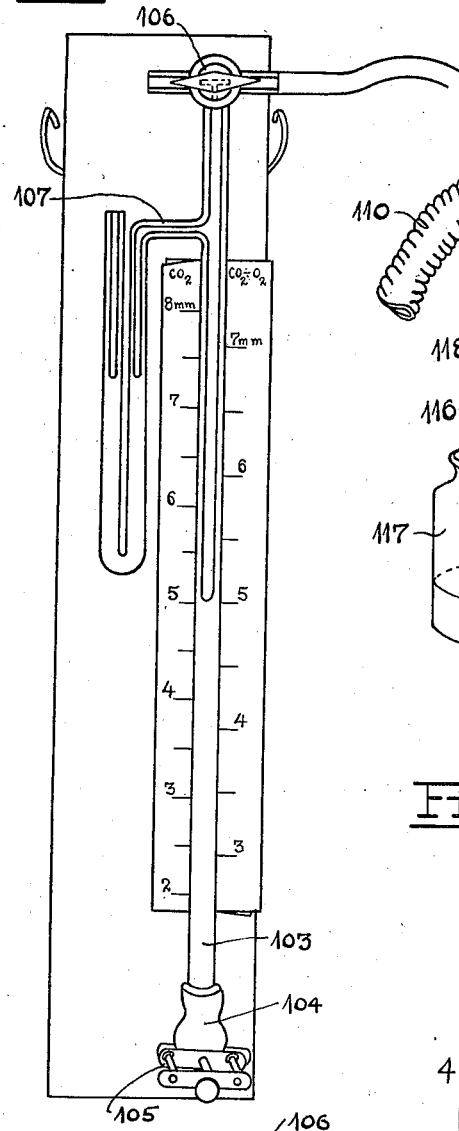
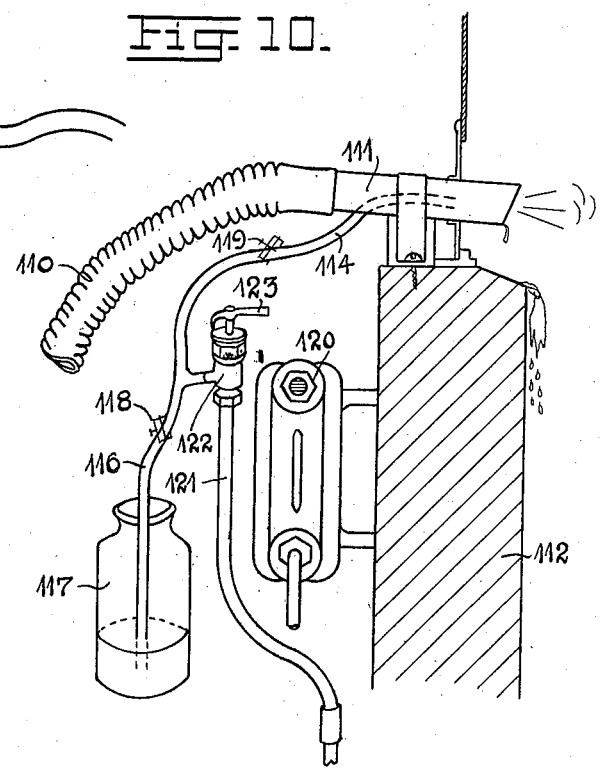
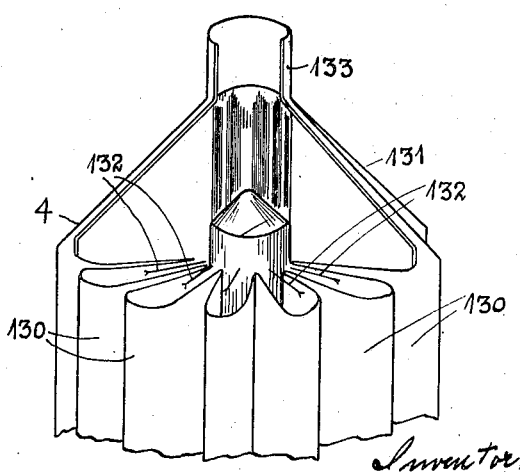
Inventor:
P. F. Scholander,
By C. F. Wendroth
Atty Sept. 5, 1939.  P. F. SCHOLANDER  2,172,038
METHOD AND APPARATUS FOR CARRYING OUT RESPIRATION ANALYSES
Filed Nov. 30, 1937   5 Sheets-Sheet 5

Patented Sept. 5, 1939

2,172,038

UNITED STATES PATENT OFFICE 2,172,038

METHOD AND APPARATUS FOR CARRYING OUT RESPIRATION ANALYSES

Per Fredrik Scholander, Oslo, Norway

Application November 30, 1937, Serial No. 177,318
In Norway November 30, 1936

9 Claims. (Cl. 23—232)

This invention relates to the examination of gases and has for its object a method as well as an apparatus which is suited for use in graphical indication of oxygen consumption and carbon dioxide production in a respiration system for atmospheric air.

An important feature of the invention consists therein that the expiration gas is led into the lower part of a gas container, from the upper part of which the inspiration gas is withdrawn as it is displaced. An apparatus for carrying out this method will therefore be characterized by the fact that the gas container which serves for the reception of inspiration gas is connected at its lower end to an admission conduit for the expiration gas, while the discharge conduit for the inspiration gas is connected to the container at the upper end.

An embodiment of an apparatus constructed according to the invention is diagrammatically illustrated in the accompanying drawings.

Fig. 4 shows the recording device.

Figs. 5, 6 and 7 show associated details.

Figs. 8 and 9 are side-views of the thermo-barometer.

Fig. 10 shows the filling arrangement for use of outdoor air.

Fig. 11 shows a part of the radiator to a larger scale.

Figure 1:
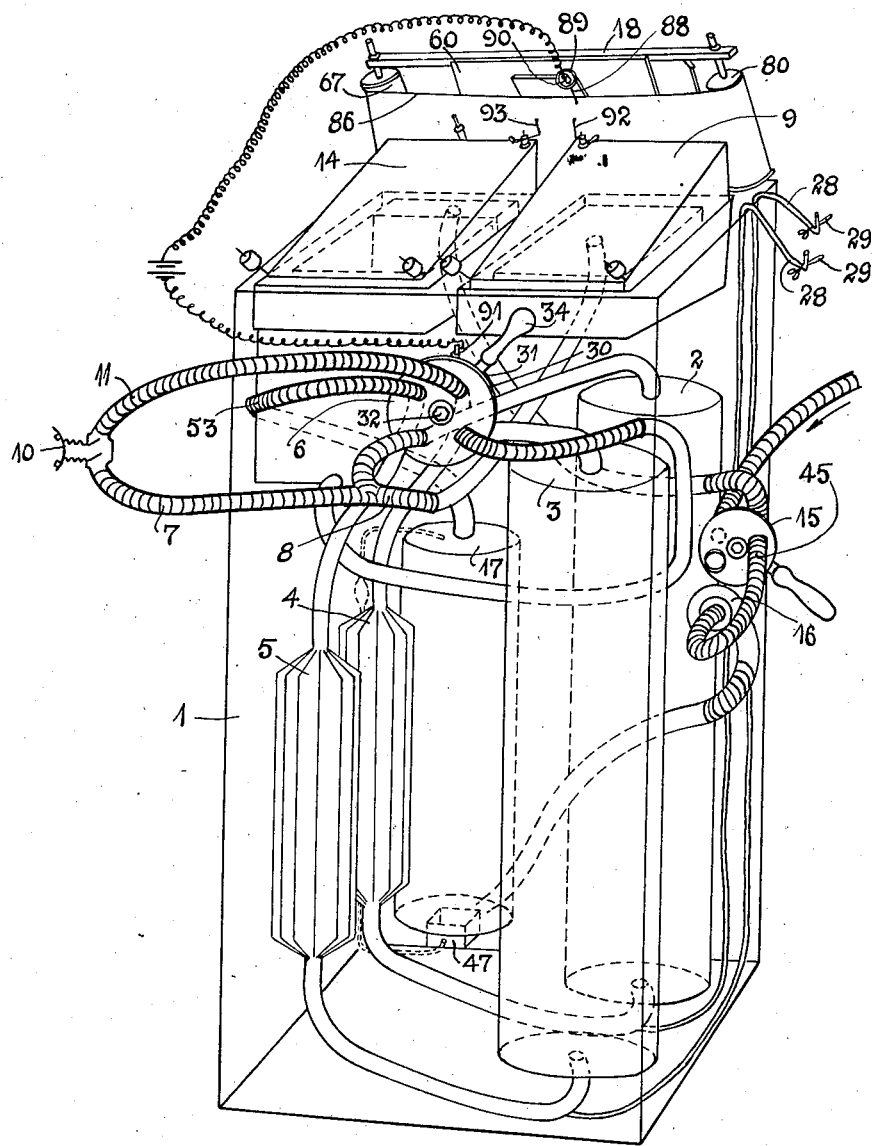
Fig. 1 shows the apparatus in a perspective view.

In the example shown, the apparatus consists of the following main parts:

Common water bath 1 with agitator (not shown); two respiration containers 2, 3 with radiators 4, 5; main connecting cock 6; respiration circuit 8—11 with inspiration tube 7, 8, recording bell 9, double mouth piece 10 and expiration tube 11; absorption circuit 12—53 with absorption box 13, recording bell 14, analysis cock 15, centrifugal fan 16 and vaporizing box 17; recording device 18 and filling arrangement for use of out-door air and an arrangement for added measuring of expired (or inspired) gas volumes.

These different parts are individually to be described in the following.

*The common water bath 1.*—One of the most important presumptions for the utility of the apparatus as gas metering instrument is its absolute thermostability, for which reason all larger gas capacities are immersed in a large common water bath. The latter serves simultaneously for fastening of all the different parts of the apparatus and contains further the 3 cm. wide, thin copper tubes which constitute the internal tube connections of the apparatus. External tube connections are made of rubber, eventually armed against kinking by means of external steel spiral windings. In order to avoid temperature stratification in the water bath, the latter is agitated by air bubbling from a small pressure aquarium pump, which is driven by the synchronous motor of the recording device.

*Respiration cylinders 2, 3.*—These are two oblong vertically positioned copper cylinders of about 60 liters' capacity. The gas-intake takes place through the bottom and the outlet through the cover. In front of such in- and out-lets, a cap 25, 26 is placed, serving for the dispersion of the gas. Near the bottom cap, eventually also beneath the cover cap, a porous gas dispersion disk 26 of the same diameter as the cylinder may be mounted, the said disk consisting of open glass-sinter or double network with glass pearls in between, or perforated plate. Through such an additional provision a more uniform distribution and current of gas all over the cylinder cross section is obtained than when the tube cap alone is used. The porous disks may, however, be done away with, especially the one beneath the cover cap. Analyses have shown that one by using tube caps alone has obtained a stratification which is good enough, but somewhat less sharp. With regard to a good stratification in the cylinder and the gas measuring, the expiration gas admitted at the bottom must have exact water bath temperature. The gas therefore first passes a specially constructed radiator (see Fig. 11).

The latter is made of thin copper sheet which is transversely folded together in star form to form 12 longitudinal hollow cooling ribs 130. Centrally between the ribs a cylindrical plug 131 pointed at the ends is mounted, which is a little shorter than the radiator. The central plug prevents a central current being of small efficiency with regard to the cooling. A rim of 12 pins 132 at each end of the plug prevents the cooling ribs from being placed together. In both ends the cooling ribs are folded together and welded, and are at each end centrally welded to a tube 133. When the gas flows into the said tube, it impels on the pointed end of the central plug and flows into the cooling ribs, in which it efficiently takes the temperature of the latter. The advantage of such radiators is that the latter in comparison with the small place which they occupy are very efficient and further substantially without resistance at their parallely connected ribs. In the deepest section between the radiator and the respiration cylinder, a small suction tube opens out for the withdrawing of condensed water vapor. This takes place by means of the suction tube 28 which is suspended over the edge of the water bath and closed by means of a clip 29.

*Main connecting cock 6.*—The principle which is used in both connecting cocks of the apparatus is two planed ground flanges 30, 31 applied against one another, which are provided with tube connections and bores and which by means of lubrication may be turned airtightly against each other.

The flanges are held together in the center by means of a screw device, and in order to obtain a good guiding with the axis hole, one of the flanges has a protruding breast which fits into a corresponding depression on the other. The axis bolt 32 is provided with disk and nut. It has at its threaded end a plane face, over which a disk may be slided longitudinally, but not turned. The disk is by means of a screw secured to the flange. When the flange 30 is turned, the axis bolt and the disk follow, so that the tightening nut which presses on the disk, cannot loosen itself. The one flange 31 is fastened to the apparatus, while the other flange 30 may be turned by means of a handle 34. On the fixed flange a small electric contact arrangement 21 is secured, which closes the battery circuit each time the cock is operated. In each flange there are in this instance four holes located at right angle and symmetrically to each other. The distance between the holes is a little larger than the hole-diameter, so that the cock in an intermediary position may be completely closed for a moment. On the fixed flange facing the water bath, the diametrical pair of tube connections are each connected to a respiration cylinder with radiator, while the movable flange in a similar way has the respiration circuit and the absorption circuit diametrically connected individually. Through 90° turning of the common cock it is thereby obtained that the respiration circuit and the absorption circuit at the same time change respiration cylinder. To both sides the movement of the cock is stopped at the right place by means of stop screws. A small electrical contact arrangement marks each connecting operation (Fig. 1, 88—91), on a basis line.

*The respiration circuit 8—11.*—The respiration tube 7—8 from the recording bell 9 is connected to the main cock by means of T-tubes. The recording bell writes the differential curve. The bell is a usual sector bell of about 8 liters, balanced and resting on steel screw points in agate and steel pans. It moves in a separate insulated water bath 35 which rests in the common bath. The inspiration tube ends in the mouth valve piece 10. The latter is of any suitable construction and is used together with nose clip. The other end of the valve piece is then connected to the main cock diametrically to the inspiration tube.

*The absorption circuit 12—17.*—From the main cock a conduit leads into the carbon dioxide absorption box 13. The latter is a rectangular brass container, which above a network bottom 38 is filled with moist soda lime. Externally of this box the water bath 39 is welded, for the carbon dioxide recording bell 14, which (14) constitutes the cover over the box. Beneath the cover, the gas outlet tube 40 is located. Due to the overpressure during filling of the apparatus, the carbon dioxide recording bell must be provided with a stop screw 41 which may prevent its further rising at a suitable level. The carbon dioxide bell is a copy of the respiration recording bell, and the calibration is equally adjusted on both through center regulation. Both such recording bells are provided with separate water baths in the common bath in order not to disturb each other during wave movements. The discharge tube of the absorption box is as it leaves the wall in the common water bath connected to the analysis cock 15. The latter is constructed according to the same principle as the main cock, only the holes are different.

Figure 3:
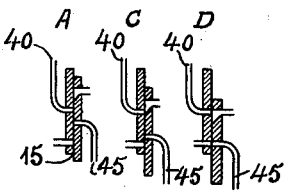
Fig. 3 shows the analysis cock in different positions.

Each flange has here two holes bored alike in both flanges. In one of the holes on the one flange, an inclined cut-out is provided, and otherwise the holes are spaced at such a distance from each other that the four positions of the cock, each with its function as shown in Fig. 3, are permitted. The correct positions of the cock are assured in each case by means of a spring which is secured to the circumference of the one flange and engages in suitably spaced grooves or stop screws in the other flange. Thus the correct position of the cock may also be felt during the switching operation. From the movable flange of the analysis cock the gas flows in a spirally armed rubber tube 45 to the fan. The latter is a small airtight enclosed and shafted centrifugal blower. This is connected through the water bath wall to the vaporizing box 17. The said box is a copper cylinder filled with pumice stone resting on a network bottom 46. Beneath the network bottom, the downwardly directed tube intake opens out and beneath such intake in the bottom of the cylinder, a small water cylinder 47 is located. From such container the water may through a sprayer-tube 50 irrigate the pumice stone by pressing the balloon conduit 51 which is carried out through the water bath wall. The water filling of the water container takes place now and then, with interruption and filling through the external balloon tube. The vaporizing box serves partly to control the water vapor content of the filling-air and partly to return the water vapor which during the carbon dioxide absorption together with the carbon dioxide have been absorbed by the soda lime. Together with the internal copper tubings, it adds further in giving the filling-air water bath temperature.

From the vaporizing box, the conduit 53 leads from the water bath and back to the main cock 6, where it is connected diametrically to the other end of the circuit.

*Recording device 18.*—For recording the curved motion of the recording bell, a writing arrangement is provided (see Figs. 4–7) which in an exact manner transmits such motion to rectilinear writing, whereby uniform calibration over the entire angular range of the bell is obtained. A paper is driven from a paper roll past a suction rail to a slowly rotating receiving cylinder. The shafts for paper- 61 and receiving cylinder 67 are supported in a bearing frame 60. The latter is adjustably secured to a base plate 65. The angle of the frame in relation to the base plate may be adjusted by means of set screw 63 and arresting screw 64. The paper roll rests on a disk 66. The attachment of the paper to the receiving cylinder 67 takes place by means of a longitudinal slot 68 which is sawed through the wall of the cylinder. In level with this slot an opening spring 69 expands internally against the cylinder wall, which spring by means of bolts 70, 71 is secured to the cover 72 of the cylinder. Such cover is turnable about the cylinder axis and constitutes at the same time the upper bearing of the cylinder. The spring follows in this turning. If now the pointed paper end is threaded from the roll into the cylinder slot 68, while the spring opening is aligned with the slot and the disk is turned, the paper is in a simple manner securely locked to the receiving cylinder 67.

The rotation of the receiving cylinder is obtained by means of a direct worm transmission 75 to a worm wheel 76, mounted beneath the cylinder. The worm is moved by means of gear 77 and chain transmission 78 from a low speed synchronous motor and may by means of an arrestable slide device 64b be released from the worm wheel during the putting-on and -off of the paper. On the frame between paper roll 80 and receiving cylinder 76, a cylindrically curved rail 81 is secured which is curved and centered accurately according to the movement of the writing pen. Open suction grooves 82, 83 are cut in the rail on the paper-side, which grooves by means of a stub of tube 84 and vacuum tube 85 is connected with a suction pump. Thus the paper 86 during its passage in front of the wheel will be sucked onto the latter and take the curvature of the same, whereby transmission of the curved writing of the recording arm to rectilinear writing is obtained, when the paper is taken off and fastened. For drawing of the base line for the curves, a small writer 88 is used, which by means of a spring 98 is adjustably secured to the upper edge of the suction rail. By means of an electro-magnet 19 and an electrical contact 91 on the main cock 6, each switching operation of the cock is marked with a notch on the base line.

The pens 92, 93 of the recording bell are through a special device secured to their bells 9, 14 in a manner which makes it easy to take them off and on and adjust them in the correct position.

This device consists of two parts: securing means for the writing arm and the writing arm. The securing means (see Fig. 7) consists of a metal disk 49 provided with a screw pin 100 which is fastened on the cover of the bell. Over the screw pin is loosely threaded an about 0.5-1 cm. thick turned disk (ring) 95 of ebonite, and on top of the latter a wide duralumin nut disk 96 with corrugated edge. The recording arm is suitably made from a thin knitting pin 97, bent together to a narrow U, having its longest end bent at the point and welded thereto is a light watch spring 98 about 5 cm. long. The said spring is glowed in the end and bent double to suit the sliding-on of the pen 99. Near the U-bend of the writing arm, the latter is bent somewhat upwards for better engagement. The writing arm is secured to the fastening means by being threaded between the ring 95 and the nut disk 96 with one leg on each side of the screw pin 100. The arresting of the writing arm takes place by tightening the nut disk.

*Thermo-barometer.*—This part has for its object quantitatively to indicate the natural oscillations of the apparatus due to the air pressure and eventual temperature changes, so that the analysis results may be corrected accordingly. The principle is well known: an air volume enclosed in the water bath and the volume changes of which are made measurable. Fig. 8 shows an embodiment which has made good service. The measuring part of the apparatus is made of a 2 ccm. burette tube 103, half filled with water and closed at its lower end by means of a rubber cap 104 provided with an adjustable screw clip 105. At the top is a threeway cock 106 beneath which there is a small manometer 107 filled with clove oil.

The threeway cock may connect the apparatus partly with a vertical copper tube 108 (Fig. 9), immersed in the water bath, and with the outdoor air. The copper tube has thin walls and is of about the same length as the respiration cylinders and contains in addition to about half a liter of air a little water on the bottom. The volume change of the air in this tube varies proportionally with the remaining air volumes of the apparatus and may be measured in a burette tube 103 by regulating the water meniscus with the clip screw 105, until the clove oil menisci 107 shows the same pressure as well within as outside the burette tube. By quantitatively comparing the movements of the recording bell in the enclosed apparatus with the thermo-barometer observations, the thermo-barometer may be provided with a scale which directly in mm. gives the corrections on the respective curves. As the carbon dioxide circuit has larger capacity than the respiration circuit, the correction on the carbon dioxide volumes for the same time interval is greater than on the differential curve.

*Filling arrangement for use of outdoor air*

The use of outdoor air in the apparatus is desirable, as particularly in small rooms the carbon dioxide variations easily become so large that they introduce substantial errors in the analyses. Particularly in winter it will be necessary to vaporize and warm the air before admitting the same to the apparatus, because the apparatus during the rapid filling is not able to equalize more than a few degrees of temperature-difference. Such prewarming may be obtained in a simple and satisfactory manner by adding to the admitted cold and dry filling air a suitable quantity of warm water vapor.

The air intake of the apparatus is connected to a 5-6 cm. wide corrugated sewer vacuum pipe 110 (Fig. 10) which at the apparatus intake is provided with thermo-barometer. The connection with the outdoor air takes place by means of the metal tube 111 which is securely fastened to the window sill or wall 112 with a small inclination outwards. To the wall of said tube is soldered a small steam tube which ends a few cm. within the outer opening of the intake tube. The steam tube is connected to an electrical permanent boiling arrangement. Through a T-connection the steam conduit is connected to a conduit 116 for discharge of condensed water vapor. The last mentioned conduit ends in a container 117 for cold water. By means of screw clips 118, 119 after the T-connection on the condensed water vapor conduit and vapor conduit, the steam addition may easily be proportioned until a suitable temperature is obtained of the filling air. The latter always becomes saturated with water vapor. By means of a positioning as above mentioned, it is obtained that the steam only during the filling is sucked into the air. Hereby unnecessary heating of the intake tube is avoided, and the condensed water vapor is done away with. In rooms with steam radiators 120, the steam question may be easily solved, the steam tube 121 of the radiator being unscrewed and connected through a cork and T-tube 122 with a steam- and condense tube of the air intake. The admission of steam may then be regulated by means of the radiator cock 123 together with the condense tube screw clip 118.

Figure 12:
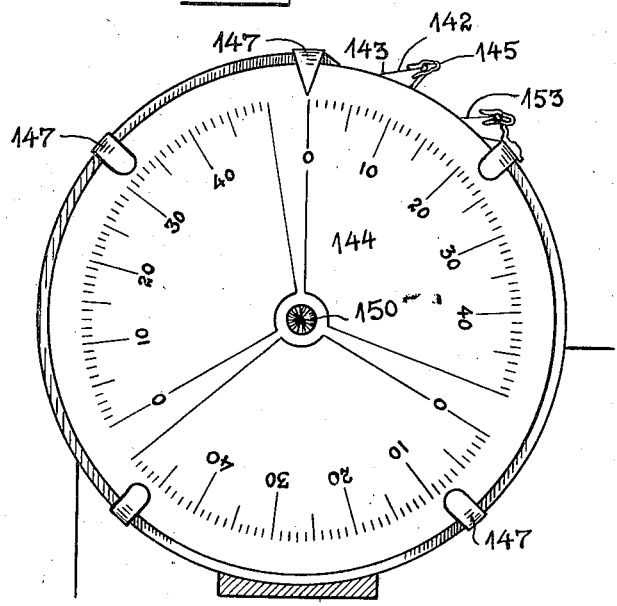
Figs. 12 and 13 are front view and vertical section respectively of an arrangement for added measuring of expired (or inspired) gas volumes.
Figure 13:
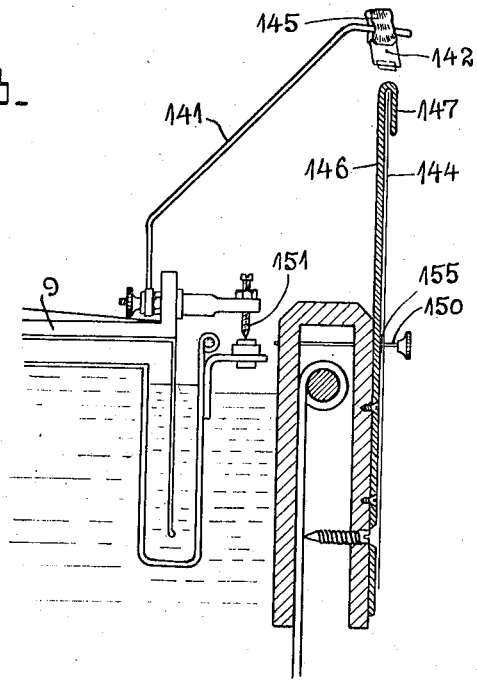

Figs. 12 and 13 show an embodiment of an apparatus for added up measuring of movement and is i. a. suited for used in apparatuses for respiration analyses of the kind described in the present application. The apparatus is characterized by a graduated disk of paper or the like in cooperation with a sharp edged pawl which transmits the movement to the disk.

The apparatus consists of an arm 141 which is rigidly connected to the recording bell 9 or the shaft of the latter. On the free end of the arm a light adjustable spring 142 is provided which in the end carried a sharp edged pawl 143 which slides on the circumference of the summation disk 144.

The pawl is suitably made from a paper strip, to which a piece of the edge of the Gillette blade is secured. The other end of the strip is adjustably secured to the arm 141 by means of a small spring clip 145. The paper strip acts as a soft spring.

The summation disk 144 is supported in a frame consisting of a thin metal plate 146 which at its end is provided with lugs 147 which are bent over the disk, and keeps the latter flat to the frame. One of the lugs 147 serves at the same time as indicator. At the place at which the pawl engages the disk 144, the plate 146 is provided with a cut-out.

By means of a fastening device which may be adapted to each separate type, the frame 146 is adjustably secured to the water bath edge or other fixed part of the respiration apparatus. The exact centration takes place by means of the shaft 150 of the disk, which may be displaced or near hereto. At the cut-out in the frame 146, that it reaches the bearing point 151 of the bell or near hereto. At the cutout in the frame 146, the latter may eventually be provided with an additional sliding pawl 153 in order to prevent the return movement of the disk during the inspiration.

The disk 144 is circular and may suitably be produced from thin writing paper. In the center it is armed by a small metal disk 155 which is glued on and has shaft bore for the shaft 150. The disk is mounted in the frame 146, in which it is movable about its shaft; the pawls are adjusted by a small pressure at the disk edge, and the disk is graduated by raising or lowering the respiration bell 9 accurately 5 liter up and down, a mark being placed in the disk between each 5 liter and the disk subsequently interpolated in liters. Eventually several scales are drawn on each disk.

The apparatus may be modified thereby that the frame is exchanged by a circular thin aluminium disk, mounted on a shaft bolt. The said bolt is bored in the center for the shaft pin 150 and is externally threaded for a nut for attachment of the graduated paper disk. The pawls act in this case directly on the circumference of the metal disk. The metal disk is secured to an adjustable fastening device, which may be adapted to the type of the respiration apparatus in question. The centering takes place by means of the shaft pin as above mentioned.

Operation

The respiration takes place through the mouth via a valve piece. The nose respiration is prevented by means of a nose clip. During the expiration the gas passes through the main cock 6 and the radiator and arrives cooled off to water bath temperature and saturated with water vapor at the bottom of the one cylinder. It is here distributed uniformly over the entire cross section and displaces atmospheric air upwards in front of it, whereby the recording bell correspondingly rises and writes the expiration volume. During the inspiration, atmospheric air is drawn from the recording bell, resulting in a sinking of the latter corresponding to the inspiration volume. For respiration in the closed circuit, the recording bell writes a differential respiration curve, the inclination of which directly gives the value $O_2$—$CO_2$, i. e. the difference between oxygen taken up and carbon dioxide given off.

Figure 2:
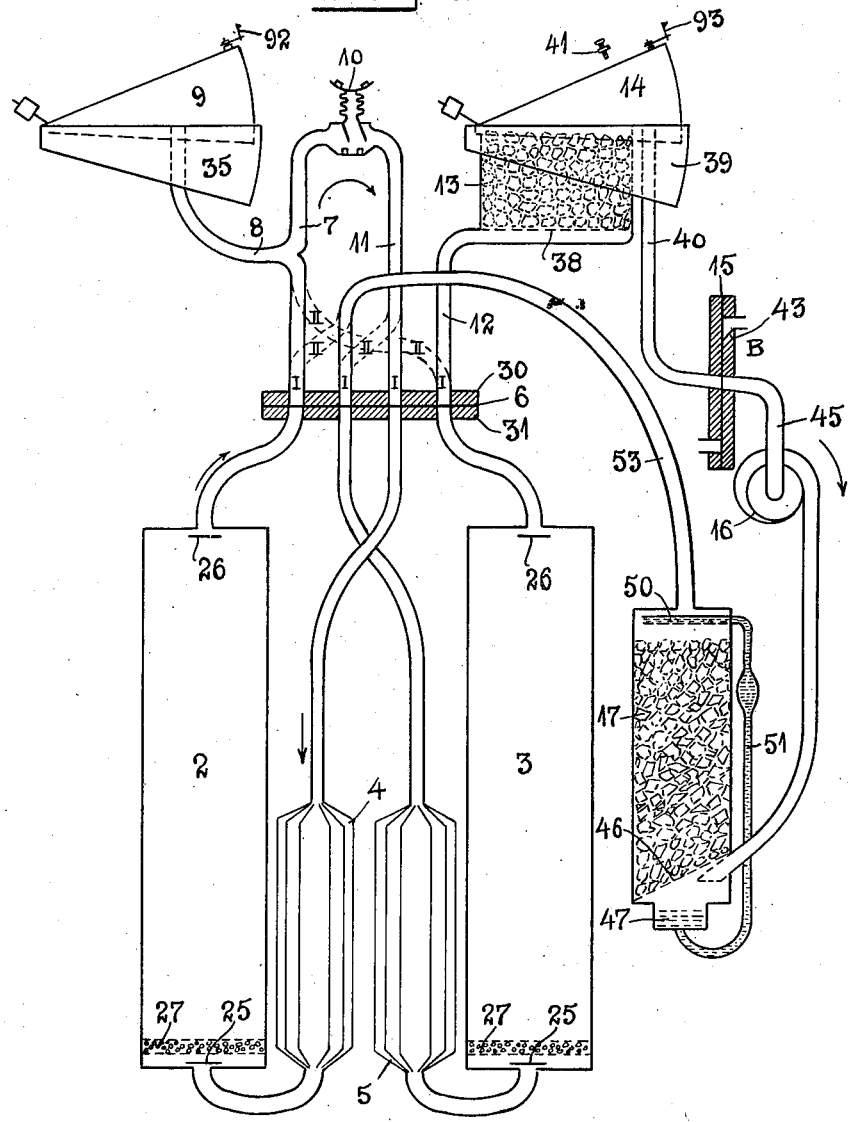
Fig. 2 illustrates the operation.

After having respired a suitable fixed period, for instance 5 minutes, the cylinder will be about ¾ full of expiration gas. The main cock 6 is then during an inspiration turned over in its other position II, and one respires in the other cylinder. The first cylinder is then by the said turning connected to the absorption circuit of the apparatus in which the air is at rest, the analysis cock being in closed position A (Fig. 3) and the fan running all the time. The analysis cock 15 is now moved to the absorption position B (Fig. 2), whereby the gas in the cylinder circulates from the cylinder 3 in series through the radiator 5, the main cock 6, the absorption box 13, the analysis cock 15 and through the vaporising box 17, in which the steam saturation is maintained, and therefrom through the main cock and back again to the cylinder 3 until all $CO_2$ is absorbed. This is marked thereby that the recording bell 14 is not sinking any more. The analysis cock is then moved back to closed position A. The quantity of carbon dioxide absorbed corresponds then to the distance from closed position before the absorption to closed position after the absorption. The cock is then moved over to position D, in which the absorption circuit is opened and the system vented and filled with atmospheric air, which finally is saturated with steam and is temperature regulated in the vaporising box and conduits. The carbon dioxide recording bell rises due to the filling pressure, until it is stopped by a stop screw 41. After sufficient venting and filling (about 30 seconds), the analysis cock is turned to outdoor air C, whereby the circuit is closed on the fan side of the cock, while the circuit on the other side through a nut 43 is opened to outdoor air, so that the filling pressure may be relieved and the apparatus may adjust itself to atmospheric pressure. The analysis cock is then closed in position A and everything is ready to operate the main cock, when the period is over.

In order to find out the actual carbon dioxide quantities separated, the atmospheric carbon dioxide must in addition to due consideration to the thermo-barometer correction, be subtracted. This value is, however, easily found by letting the apparatus absorb directly after a filling, an operation which must take place at each experiment if room air is used. Because the respiration bell as well as the carbon dioxide recording bell are placed on the patient side of the main cock, continual writing is obtained of both such values independently of operations of the main cock. Because further inspiration takes place directly from the recording bell and not through the main cock, the latter may be operated unnoticeably for the patient during the inspiration. By making the recording bells as alike as possible and besides by adjusting the centra so as to obtain identical angular calibration, it is obtained in connection with the recording method here described that the differential curve values and the carbon dioxide values become the same scale and thus directly by means of divider may be placed together to give the oxygen values. If the carbon dioxide writing pen is positioned a period length to the left of, i. e. after the respiration writer, synchronizing of the curves is further obtained. In order during the different periods to obtain mutually comparable carbon dioxide oxygen values, each period must be made exactly of the same length by means of a clock. By comparing the distance of the switching marks on the base line, this may afterwards be controlled.

*Other use of the stratification apparatus principle*

If desired, the apparatus may also be used in other ways than those here described. In using face mask or in chamber experiments for smaller animals, the ventilation must be artificial. This takes place by means of a small airtight centrifugal fan, which is connected in series with the mask respectively with the chamber, and the whole subsequently positioned in the place of the respiration tubes. It is controlled on the carbon dioxide curve that no respiration takes place at the end of the periods, the ventilation being regulated by means of a screw clip on the one fan conduit.

The apparatus may also be used with other gas mixtures or gases other than air, as the expiration gas will always be the heaviest. For this use the filling tube is connected to the gas container in question.

For inspiration gas free of carbon dioxide, as for instance oxygen, a simplified method may be used. The gas is then added directly after the absorption—with the analysis cock on outdoor air C—directly from a bomb, until the carbon dioxide bell 9 has risen up to its screw, whereupon the bomb and then the analysis cock is closed. The gas is admitted through the T-connection fitted in one of the external conduits of the absorption circuit. The analysis cock must hereby not be moved to filling position.

In connection with moderate and larger working experiments, the apparatus must not be used continually with dimensions as here mentioned. The cylinders must then be made substantially larger, and for large working outputs, the tube dimensions in the apparatus should also be increased. If there are difficulties in the carbon dioxide absorption under such conditions, the absorption box may be done away with. During the absorption circulation nothing else takes place than the thing that the expiration and inspiration gases are mixed. In each period a sample is now (taken in a Haldane apparatus) from one of the external conduits of the absorption conduit taken down in a Haldane apparatus, and $CO_2$ is determined at once. The advantage of such an arrangement in connection with working experiments will be that the respiration curve is still obtained in the shape of a differential curve, and that the inconvenient $O_2$ analyses with the Haldane apparatus are avoided, and further that the analyses become continuous without interpolation. The carbon dioxide concentration found, minus an invariable for the atmospheric air carbon dioxide multiplied by the cylinder capacity with conduits then becomes equal to the carbon dioxide quantity separated. $O_2$ is obtained in the usual manner from the differential curve and the carbon dioxide. The stratification apparatus here described for gas exchange analyses has the following advantages:

It gives as a direct volumetrical analysis result graphically the difference $O_2=CO_2$.

It gives as a direct volumetrical analysis result graphically the carbon dioxide production including a known amount of atmospheric $CO_2$ to be subtracted.

These volumes give together by simple addition or subtraction the oxygen consumption.

It gives the ventilation on a scale.

It works with atmospheric air, the only physiological respiration gas.

If desired, the apparatus may work with any other gas mixture or gas.

During the respiration no nitrogen accumulation in the apparatus takes place and neither any other changes of the composition of the inspiration gas.

It works continually without time limit.

The differential curve in connection with the carbon dioxide curve gives a better base for the determination during the experiment of the gas exchange uniformity than the less varying oxygen consumption curve.

The apparatus is in itself a complete unit, which without auxiliary means, such as oxygen bombs, lye bottles, titration, weighing, or the like directly graphically gives the basic gas values: respiration curve, differential curve, carbon dioxide output, and through simple addition or subtraction, the oxygen consumption.

It offers great reliability, that one on each analysis curve directly, period for period may control if the apparatus has worked with its full precision in respect of the differential curve as well as the carbon dioxide absorption curve. This is namely easily seen from the different sections of the carbon dioxide curve.

The apparatus is simple to operate and therefore also well suited for clinic use.

The analysis accuracy of the apparatus determined by the alcohol burning is good.

In a series of 12 determinations, all the RQ-values i. e. $CO_2:O_2$ have been between 0.666–0.668, the theoretical value being 0.667. For five acetone burning tests, the values found were all between 0.750–0.752, the theoretical value being 0.750.

I claim:

1. A method for the examination of respiration gases comprising conveying the expiration gas in a closed system of circulation tubes into the lower part of a gas chamber, withdrawing from the upper part of said gas chamber the inspiration gas and replacing the same by the expiration gas which is introduced from below until said chamber is filled to about three-fourths of its capacity with expiration gas, recording the respiratory difference curve during said steps and then determining the production of carbon dioxide by absorption of the carbon dioxide that has accumulated in the circuit.

2. A method for the graphical determination of the difference between the utilized oxygen and the expelled carbon dioxide in which the inclination of the respiratory difference curve in a respiration system for atmospheric air is recorded, which comprises cooling the expired gas then introducing said expired gas into the bottom part of a thermo-stabilized container through a gas-dispersing device, whereby said expiration gas deposits itself due to its greater specific gravity in the lower part of said container separately below the inspiration gas so that the gas inspired from the top of the container through a recording spirometer bell will always consist of unmixed atmospheric air and reversing the respiratory circuit before the mixed layer has reached the top of the gas container.

3. A method as set forth in claim 1 wherein two gas containers are utilized and a switch-over device is used which may be alternately coupled to the respiration and the absorption chamber so as to secure continuous operation of the system.

4. An apparatus for the examination of inspiratory and expiratory gases comprising a container for the inspiration gas, a tube connected adjacent the bottom of said container for the admission of expiration gas and a discharge tube for the inspiration gas located adjacent the top of said container.

5. An apparatus as set forth in claim 4 in which said container is thermostabilized and a cooler is inserted into the supply connection for the expiration gas.

6. An apparatus as set forth in claim 4 in which a bell apparatus having a recording device is introduced in the tube for the inspiration gas.

7. An apparatus as set forth in claim 4 in which a coupling arrangement is used comprising two rotatable flanges adjustably held together at their centers by a screw arrangement, the contracting surfaces of said flanges being smoothly ground and lubricated and being provided with holes having tube sockets.

8. An apparatus as set forth in claim 4 in which there is provided an arrangement for graphical recording and means are provided for transforming the peripheral writing of the recording pen into rectilinear writing, said means comprising a cylindrically curved band which is centered and curved according to the movement of the recording pen and is provided with suction tubes connected to a vacuum tube so that the paper passing over said band will be sucked into it and assume its curvature.

9. An apparatus as set forth in claim 4 wherein an arrangement is provided for the measurement of the summed up quantities of expired or inspired gas, said arrangement comprising a graduated circular paper disc which is set in movement around its axis by a sharp edged pawl, which grips the edge of the disc and which is forced to move in accordance with the recording bell of the apparatus.

PER FREDRIK SCHOLANDER.